United States Patent [19]
Doherty

[11] Patent Number: 6,151,715
[45] Date of Patent: Nov. 28, 2000

[54] REHABILITATION/TRAINING DEVICE

[76] Inventor: Jocelyn M. Doherty, 5617- 95th St. SW., Apt. JJ202, Lakewood, Wash. 98499

[21] Appl. No.: 09/396,100

[22] Filed: Sep. 14, 1999

[51] Int. Cl.[7] .............................. A41D 1/04; A41D 11/00
[52] U.S. Cl. ........................... 2/48; 2/69; 2/102; 434/260
[58] Field of Search ............................... 2/69, 80, 83, 48, 2/51, 49.1, 102, 106, 111, 94, 113, 114, 115; 434/260, 395, 258

[56] References Cited

U.S. PATENT DOCUMENTS

| | | | |
|---|---|---|---|
| 2,501,902 | 3/1950 | Howell | 35/28 |
| 2,527,242 | 10/1950 | Clark | 434/260 |
| 2,972,820 | 2/1961 | Cano | 35/56 |
| 3,638,334 | 2/1972 | Malikowski | 35/8 R |
| 3,997,982 | 12/1976 | Holland | 35/56 |
| 4,253,197 | 3/1981 | Posta | 2/80 |
| 4,637,798 | 1/1987 | Maiden-Nesset | 434/191 |
| 4,661,072 | 4/1987 | White | 434/260 |
| 4,710,979 | 12/1987 | Bull et al. | 2/48 |
| 4,723,323 | 2/1988 | Wright, Jr. | 2/49 |
| 5,718,589 | 2/1998 | McCracken et al. | 2/80 |
| 5,799,328 | 9/1998 | Harlem et al. | 2/69 |
| 5,960,471 | 10/1999 | Burton | 2/48 |

*Primary Examiner*—Amy B. Vanatta
*Attorney, Agent, or Firm*—R. Reams Goodloe, Jr.

[57] ABSTRACT

A rehabilitation/training device. The device is in the form of an apron having multiple simulated apparel closures. The simulated apparel closures are mounted on layered fabric panels. Pockets are provided for storing hand exercise equipment, such as a ball of clay, and for storing a pad of paper, as well as for storing one or more writing/drawing implements.

21 Claims, 8 Drawing Sheets

REHABILITATION/TRAINING DEVICE

TECHNICAL FIELD

The present invention generally relates to training and education aids for the development of coordination and manipulative skills. More particularly, the invention relates to devices for the rehabilitation of individuals with physical handicaps, such as stroke victims.

BACKGROUND

Prior known devices for the rehabilitation and development of manipulative skills have only partially addressed such needs. Prior art devices known to me provide only a limited range of the fasteners and closures normally associated with apparel. For example, U.S. Pat. No. 3,997,982, issued to Holland on Dec. 21, 1976 and entitled *Training Vest Or The Like* discloses a vest having a series of replaceable or interchangeable practice panels, each having different types of fasteners, including various clothing fasteners such as buttons, snaps, zippers, hooks, laces and buckles. However, the replaceable or interchangeable panels are inherently unavailable, except through the process of physically replacing the panels actually being used.

In another example, U.S. Pat. No. 2,972,820 issued to Cano on Feb. 28, 1961, and entitled *Educational Training Device,* discloses a number of fasteners separately arrayed on a rigid plane. Both the arrangement of the fasteners and the rigid back plane upon which the fasteners are mounted for manipulation (while the device is mounted an a table or the user's lap), fail to provide the manipulative challenge which would be presented by fasteners situated on the user's person. Also, U.S. Pat. No. 4,723,323, issued to Wright, Jr. on Feb. 9, 1988, entitled *Child's Activity Bib,* similarly discloses a number of separately arrayed manipulative devices. Wright, Jr. discloses various infant activities presented on a fabric bib worn by a child's mother or other caretaker. Although available to the grasp of held child, the arrangement also fails to provide the manipulative challenge which would be presented by fasteners situated on the user's person.

In yet another example, U.S. Pat. No. 3,638,334 issued to Malikowski on Feb. 1, 1972, for a *Training Garment,* discloses several separate vests mounted on the user's person by shoulder straps and a back belt. Each vest presents a different fastening challenge, one of either buttoning or zippering. Thus, the user must remove one training garment and don another separate training garment to practice alternative fastening skills.

In still another example, U.S. Pat. No. 4,661,072, titled *Child's Protective, Entertainment Or Educational Device,* issued to White on Apr. 28, 1987, discloses a vest for the amusement and education of small children, including ribbons for tying a bow; shoestrings laced through relatively large plastic rings; a pocket with a secure flap; layered panels secured by a zip fastener over panels secured by buttons and button holes; a tether for securing a baby toy; and a second tether suspending a small multi-layer wax tablet, the wax tablet being of the type sold under the trade name MAGIC SLATE that is written by rubbing using any relatively dull implement to avoid tearing the writing layer and is erased by separating the writing layer from the wax board layer. Although the wax tablet provides a rudimentary drawing/writing implement, the tethered nature of the suspension limits the tablet's use in the development of the muscles and motor skills necessary for withdrawing and returning the tablet to a secure location, such as a pocket.

Thus, prior known devices for the development of manipulative skills fail to provide the constant availability of the full range of fasteners and closures normally associated with apparel while having those fasteners and closures situated as normally experienced by the person donning the apparel by integration of such devices into a single apparatus adapted for mounting on the user's person, such that the fasteners and closures are positioned and oriented in a normal operating relationship to the user's person.

Furthermore, prior known devices have not generally addressed the need for development of muscle tone in the rehabilitation of physical handicaps by providing means for muscular development beyond that required for manipulation of apparel fasteners and closures. Thus, it would be advantageous to provide a rehabilitation device that provides, in combination with fasteners and closures, additional manipulative and training implements which, at least to some degree, provide for increased muscle tone development, particularly in the hands.

SUMMARY

The present invention overcomes the limitations associated with any one or more of the prior art devices by providing a rehabilitation/training device in the form of an apron having multiple simulated apparel closures mounted on layered fabric panels and pockets for storing squeezable hand exercise equipment, a paper pad and one or more writing/drawing implements. The apron of the invention provides layered panels having a variety of zipper, button, snap, and hook and eye closures thereon. Straps located and secure the various apparel simulating panels in positions and orientations on the person of the user in typical of actual apparel. The straps preferably cross behind the person of the user to close and secure the apron without additional devices such as belts, laces, and ties which require either the reaching behind the person of the user by the user or the aid of a nonuser. Thus, the overlapping or crossing straps provide a convenience and ease of use not known in the prior devices.

According to one aspect of the invention, the apparatus of the present invention includes a fabric apron having two straps spaced apart on opposing sides of a midline of the apron and several pairs of fabric panels attached in layered fashion on an anterior portion of the apron, one of each pair of fabric panels positioned on either side of said midline of the apron. One pair of fabric panels includes cooperating snap fasteners secured to adjacent edges of the fabric panels adjacent the apron's midline. Preferably, different ones of the cooperating snap fasteners are differently configured relative to others of the cooperating snap fasteners to provide a variety of manipulation challenges.

According to another aspect of the invention, a second of pairs of fabric panels includes buttons and cooperating button holes positioned on either side of said midline of the apron. As with the snap fasteners, different ones of the cooperating buttons and button holes are preferably differently sized relative to others of the cooperating buttons and button holes to provide a variety of manipulation challenges.

According to another aspect of the invention, a third pair of fabric panels includes a pair of cooperating zipper tracks positioned on either side of said midline of the apron. One of the zipper tracks includes a zipper pull which cooperates with the zipper tracks to open and close the panels.

According to another aspect of the invention, one or more of the pairs of fabric panels preferably further includes optional cooperating hook and eye fasteners positioned on either side of said midline of the apron. As with the snap and button fasteners, different ones of the optional cooperating hook and eye fasteners are preferably differently sized relative to others of the cooperating hook and eye fasteners to provide a variety of manipulation challenges.

According to still another aspect of the invention, a pair of shoe panels are positioned on either side of said midline of the apron remotely from the above mentioned pairs of fabric panels. The shoe panels simulate shoes, including several eyelets formed therein and each having a shoe lace threaded through one or more of the eyelets.

According to yet another aspect of the invention, one or more fabric pockets are positioned on either side of said midline of the apron remotely from the above mentioned pairs of fabric panels, including the shoe panels. The apron of the invention also includes one or more minor pockets adapted for carrying a writing and/or drawing implement, such as a pencil, pen or marker. While the minor pockets are optionally positioned remote from the pockets and other fabric panels mentioned above, according to one preferred embodiment of the invention, at least one minor pocket is formed on either the interior or exterior surface of the fabric panel forming one of the pockets. According to one preferred embodiment of the invention, at least one fabric pockets is formed of an essentially water-resistant or water-proof material. This water-resistant or waterproof is preferably formed with expanding or accordion side and bottom panels and is adapted to contain a squeezable hand exercise device or object.

BRIEF DESCRIPTION OF THE DRAWING

In the various figures, like numerals indicate like elements.

DETAILED DESCRIPTION

Figure 1:
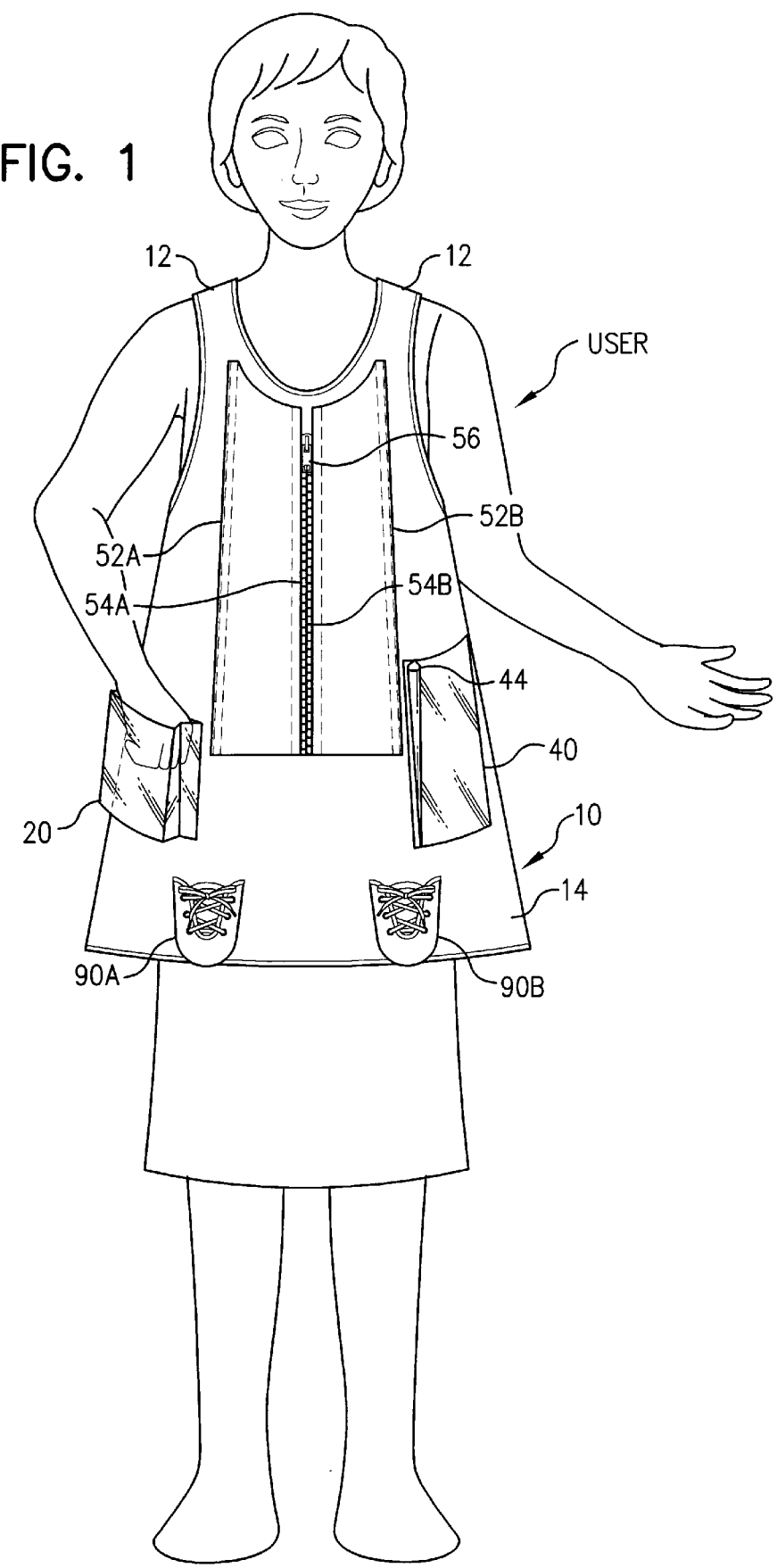
FIG. 1 is a front view of the rehabilitation/training device of the present invention presented as an apron mounted by integral shoulder straps onto the person of a user.

FIG. 1 is a front view of the rehabilitation/training device of the present invention presented as an apron 10 mounted by integral shoulder straps 12 onto the person of a user. Straps 12 pass over the user's shoulders and locate the body 14 of apron 10 in the anterior torso area of the user's person. Body 14, including straps 12, is formed of one or more panels of a flexible material. For example, according to one preferred embodiment, the material is a fabric material such as denim that is both machine washable and machine dryable using conventional appliances. The fabric is any color and design, preferably a color and design that are generally attractive to young children or another population for which the device is intended. Apron 10 includes a wide variety of fastening and closure activities associated with the donning of apparel, as well as other activities useful in the development of muscle tone and manipulative skills during the training of children and rehabilitation of physical handicaps. The activities, which are described in detail below, include pockets, simulated laced shoes, and other fastening and closure activities, are all attached to body 14 of apron 10 as by sewing or another appropriate method.

Figure 2:
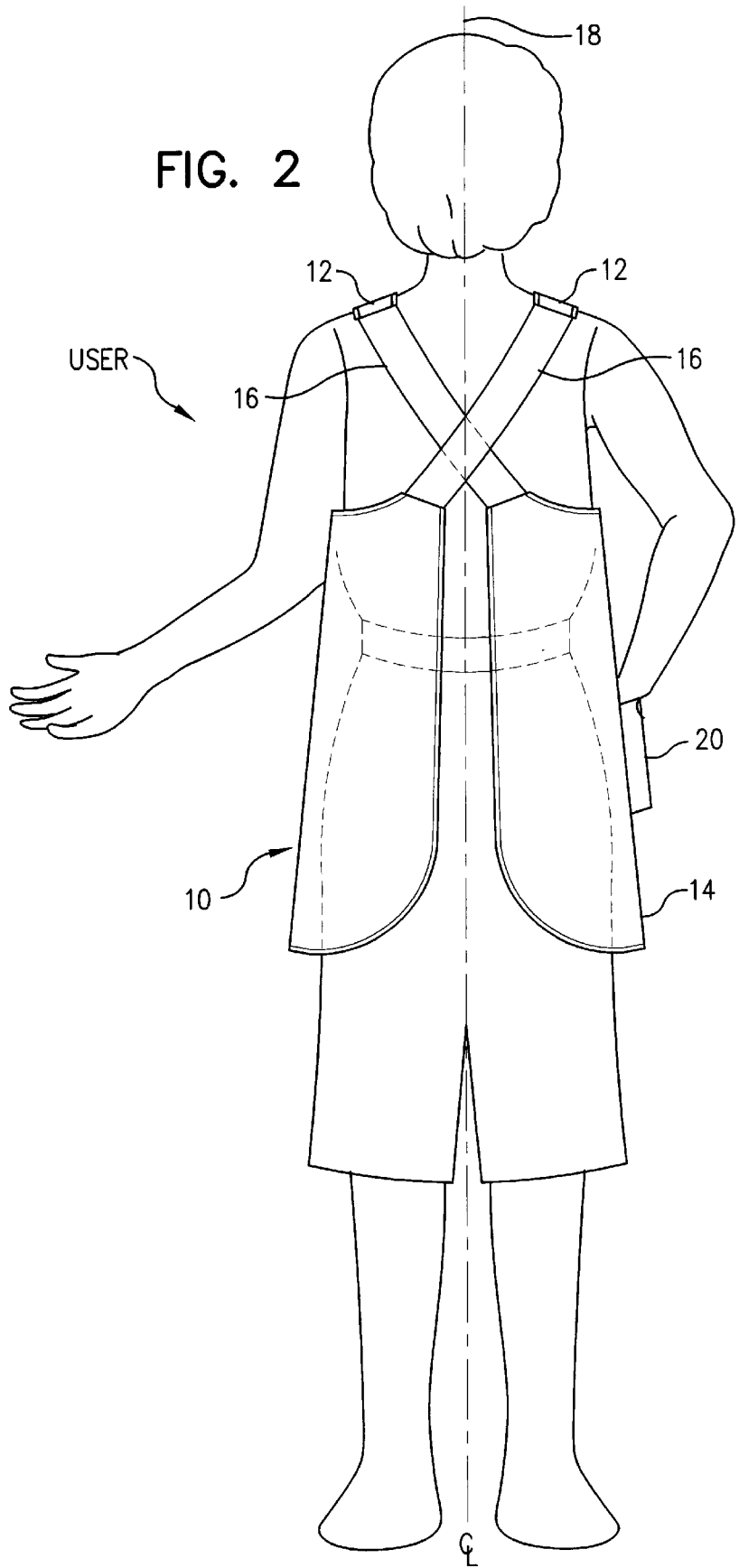
FIG. 2 is a posterior view of the apron of the present invention, showing the back closure and overlapping straps securing the apron onto the person of a user.

FIG. 2 is a posterior view of apron 10 of the present invention, showing the back closure and overlapping straps 16. Overlapping strap extensions 16 are extensions of shoulder straps 12 attached, as by sewing. Overlapping strap extensions 16 each cross the midline 18 of body 14 and extend between shoulder straps 12 and opposite sides of the posterior portion of body 14. Overlapping strap extensions 16 thus form armholes on either side of apron 10. Overlapping strap extensions 16 keep apron 10 securely positioned on the user's person without need for additional posterior security mechanisms, such as belts, straps, buttons, or ties, as required by prior art devices. Thus, apron 10 is secured on the user's body without aid from another person or any need for the user to reach behind the body. According to one preferred embodiment, overlapping strap extensions 16 are formed of any flexible material, preferably relatively wide elastic fabric strips to ensure maximum comfort to the user. For example, in one embodiment, the elastic strips are about 2 inches wide.

Figure 3:
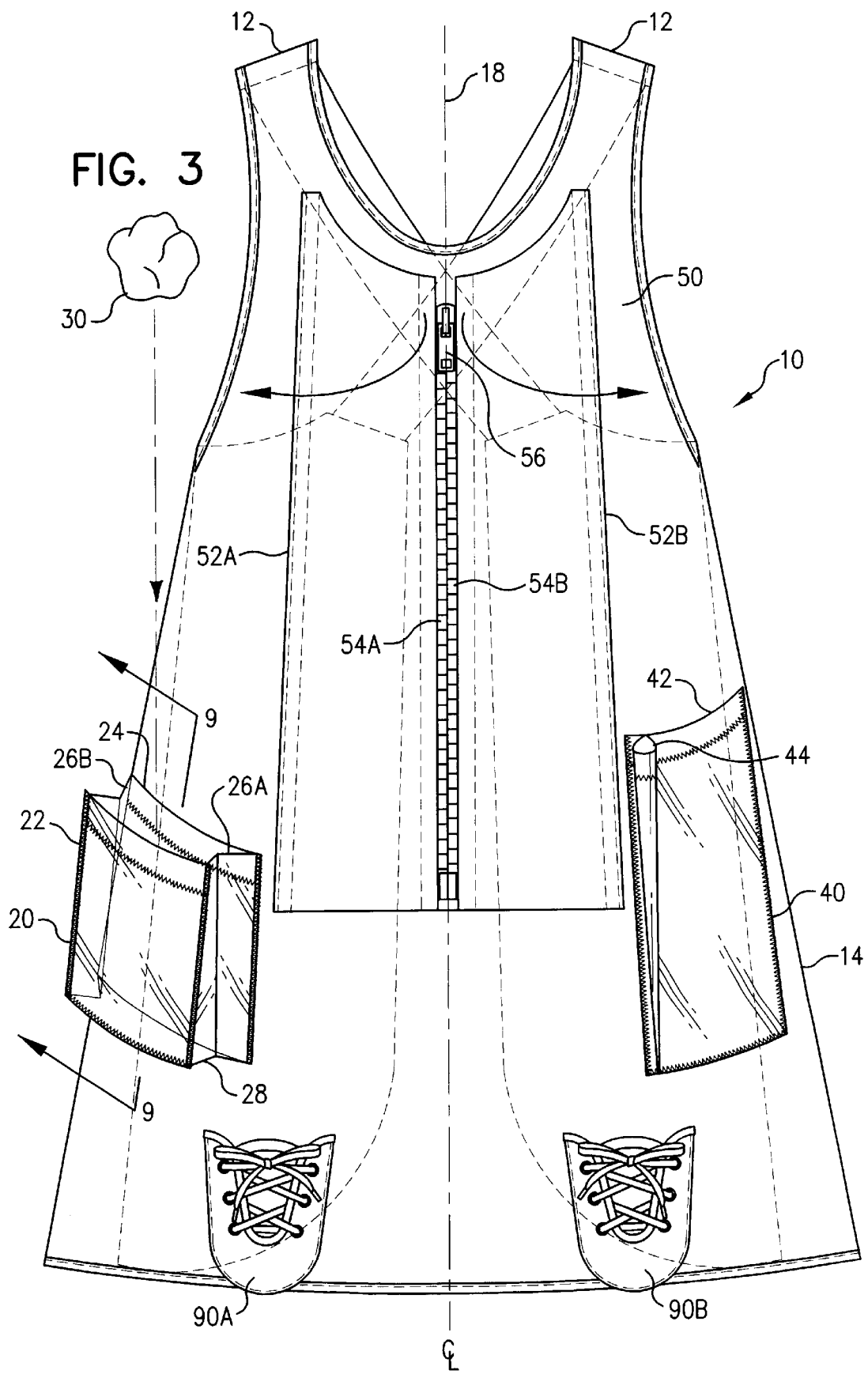
FIG. 3 is a detailed front view of the apron of the invention.

FIG. 3 is a detailed front view of apron 10 of the invention. As mentioned above, apron 10 includes pockets 20 and 40, multiple fastening and closure activities 50, and simulated laced shoes 90A and 90B, each described in detail in connection with the further discussed below. Shown in greater detail in FIG. 9, pocket 20 is preferably of an expanding or accordion configuration capable of storing relatively large objects. Accordion pocket 20 is preferably configured with flat front 22 and back 24 panels joined by accordion side panels 26A and 26B and an accordion bottom panel 28. Accordion pocket 20 is preferably provided with a large top opening for easy access. Accordion pocket 20 is attached as by sewing, preferably at the side and bottom edges of back panel 24, to the anterior face of apron 10 with the opening facing upwardly, as shown. Accordion pocket 20 is preferably oriented at about a typical pocket level, i.e., about hip level, and spaced away from the midline 18 of the anterior face of body 14 preferably at about a typical pocket location. Pocket 20 is preferably formed with a relatively large opening, whereby the user is able to insert a hand and larger objects. One preferred object for storage in pocket 20 is an amount of clay 30, or alternative device such as Silly Putty®, a rubber ball, a hand grip device of the type of spring-loaded exercise device typically used in body building and commonly available at retail sports equipment stores, or another squeezable object useful in physical therapy for the development of hand, wrist and arm muscle strength and tone.

Second pocket 40 is attached (such as by sewing or another appropriate method) at the edges of pocket panel 42 to the anterior face of apron 10. Second pocket 40 is preferably located at about a typical pocket level, i.e., about hip level, and spaced away from midline 18 of the anterior face of body 14 opposite pocket 20, preferably at about a typical pocket location. Second pocket 40 is preferably of a slimmer configuration as compared with accordion pocket 20 and is sized appropriately to store a writing or drawing pad. According to one preferred embodiment, second pocket 40 includes one or more minor pockets 44 formed in the face of pocket panel 42. Such minor pockets 44 are preferably sized to hold the stem of a writing or drawing implement, i.e., a pencil, pen, marker or other device suitable for forming marks on paper. Minor pockets 44 are optionally formed on either the exterior face (shown) or the interior face (not shown) of pocket panel 42. Minor pockets 44 are alternatively formed remotely from second pocket 40, preferably as a patch of fabric formed with one or more separate pockets suitably configured for holding the stem of such writing or drawing implement.

FIG. 3 also shows multiple fastening and closure activities 50 attached to the anterior face of body 14 of apron 10. Multiple fastening and closure activities 50 presents in layered fashion a series of garment fasteners and closures in a fashion normally associated with apparel. Each of activities 50 are situated and oriented by straps 12 on the person of the user as normally encountered by the person donning the apparel, such that skills are readily transferable to actual articles of apparel. Each of activities 50 are mounted on cooperating fabric panels located to open and close along midline 18 of body 14 in the operative relationship with the user's body as normally encountered in actual articles of apparel. Each of activities 50 are attached hinge-like to the anterior face of body 14 as by sewing or another appropriate method. Each of activities 50 are positioned relative to one another in a layered fashion such that the panels of each activity 50 fold back to reveal the subsequent activity 50 positioned behind.

Each of activities 50 simulates a portion of a conventional article of apparel. A first or top layer of activities 50 presents two panels 52A and 52B attached to the anterior face of body 14 on opposing sides of midline 18. Each panel 52A and 52B is formed of fabric and includes an interior edge lying essentially along midline 18. Each panel 52A and 52B is equipped with cooperating zipper tracks 54A and 54B, respectively, secured along its interior edge (more clearly shown in FIG. 4). A zipper pull 56 joins cooperating zipper tracks 54A and 54B. Zipper tracks 54A and 54B and zipper pull 56 are formed of either metal or plastic and are preferably of a size which permits of relatively easy manipulation. Panels 52, in combination with cooperating zipper tracks 54 and zipper pull 56, thus present an opening which corresponds to a conventional opening in an article of apparel, for example, a jacket. Straps 12 position panels 52 on the person of the user in a fashion similar to that assumed by the actual article of apparel. The fabric of panels 52A and 52B are preferably color matched. The color of panels 52A and 52B is preferably different from the colors of the fabric forming body 14 and each of the other activities 50, such that each of activities 50 is easily discernable visually from body 14 of apron 10 and is color coded for ease of matching the respective panels. For example, panels 52A and 52B are colored blue, while subsequent ones of activities 50 are colored green and red.

Figure 4:
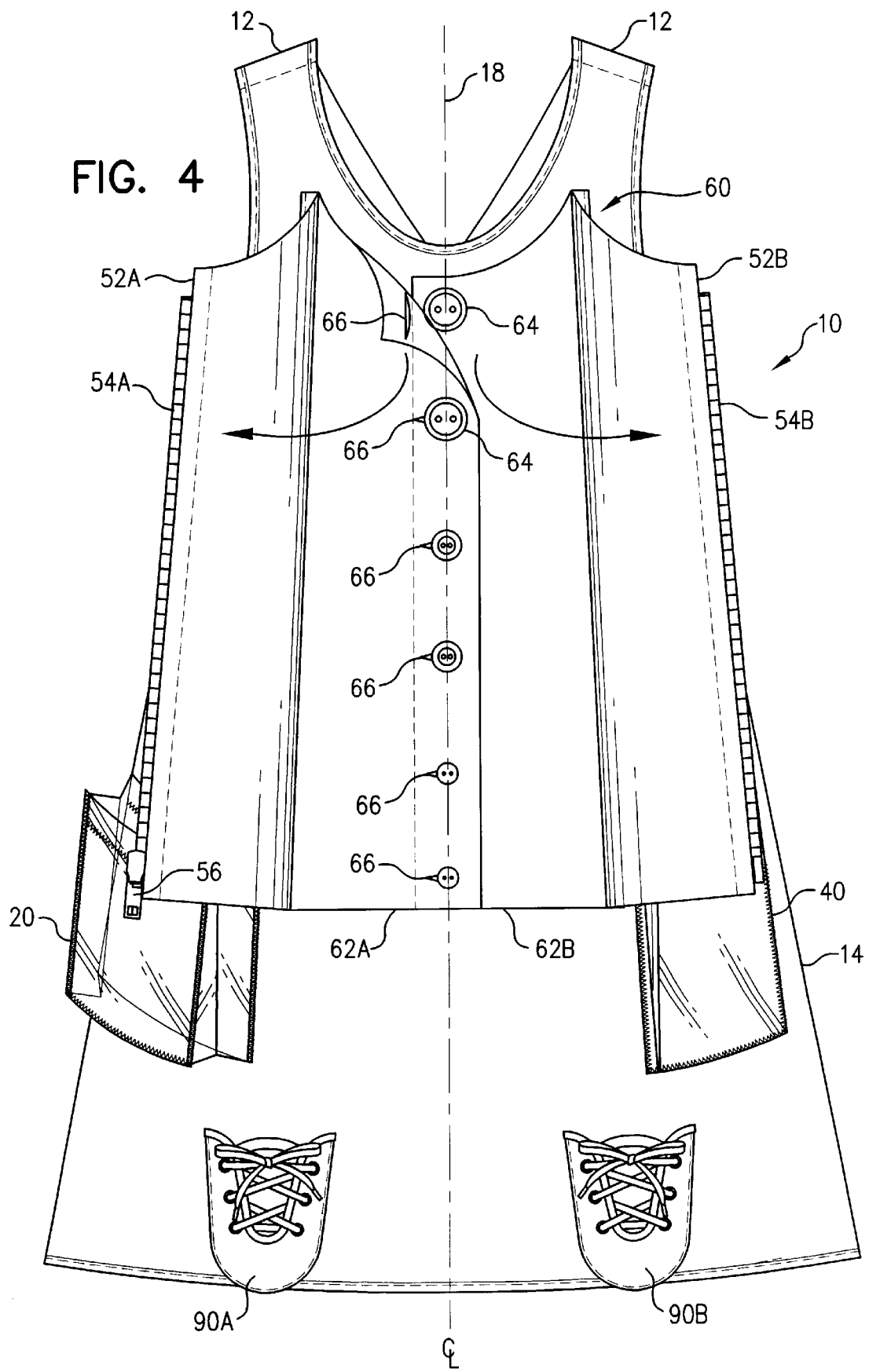
FIG. 4 shows zipper panels in an open or unfastened state and folded back to reveal another of layered activities simulating a portion of another conventional article of button closure apparel, for example, a shirt or blouse.

FIG. 4 shows zipper panels 52A and 52B in the open or unfastened state and folded back to reveal another of layered activities 50. In FIG. 4, a second activity 60 constitutes a second layer of activities 50 positioned behind zipper panels 52 and simulates a portion of another conventional article of button closure apparel, for example, a shirt or blouse. Second activity 60 presents two panels 62A and 62B attached to the anterior face of body 14 on opposing sides of midline 18. Each panel 62A and 62B is formed of fabric and includes an interior edge lying essentially along midline 18. One of panel 62A and 62B is equipped with one or more buttons 64 secured along its interior edge, while the other of panel 62A and 62B is equipped with one or more cooperating button holes 66 formed along its interior edge (more clearly shown in FIG. 5). Buttons 64 and cooperating button holes 66 are preferably of a size which permits of relatively easy manipulation. In a preferred embodiment, buttons 64 are provided in varying sizes ranging from relatively large to relatively small, such that a range of manipulative challenges are presented to the user. For example, buttons 64 are provided in three different common sizes in the ranges of $7/8$ inch, $1/2$ inch, and $7/16$ inch diameters. Panels 62, in combination with cooperating buttons 64 and button holes 66, thus present an opening which corresponds to a conventional opening in an article of apparel, for example, a shirt or blouse. Straps 12 position panels 62 on the person of the user in a fashion similar to that assumed by the actual article of apparel. The fabric of panels 62A and 62B are preferably color matched. As mentioned above, the color of panels 62A and 62B is preferably different from the colors of the fabric forming each of the other activities 50, such that each of activities 50 is color coded for ease of recognition. For example, panels 62A and 62B are colored green, while earlier and subsequent ones of activities 50 are colored blue and red.

Figure 5:
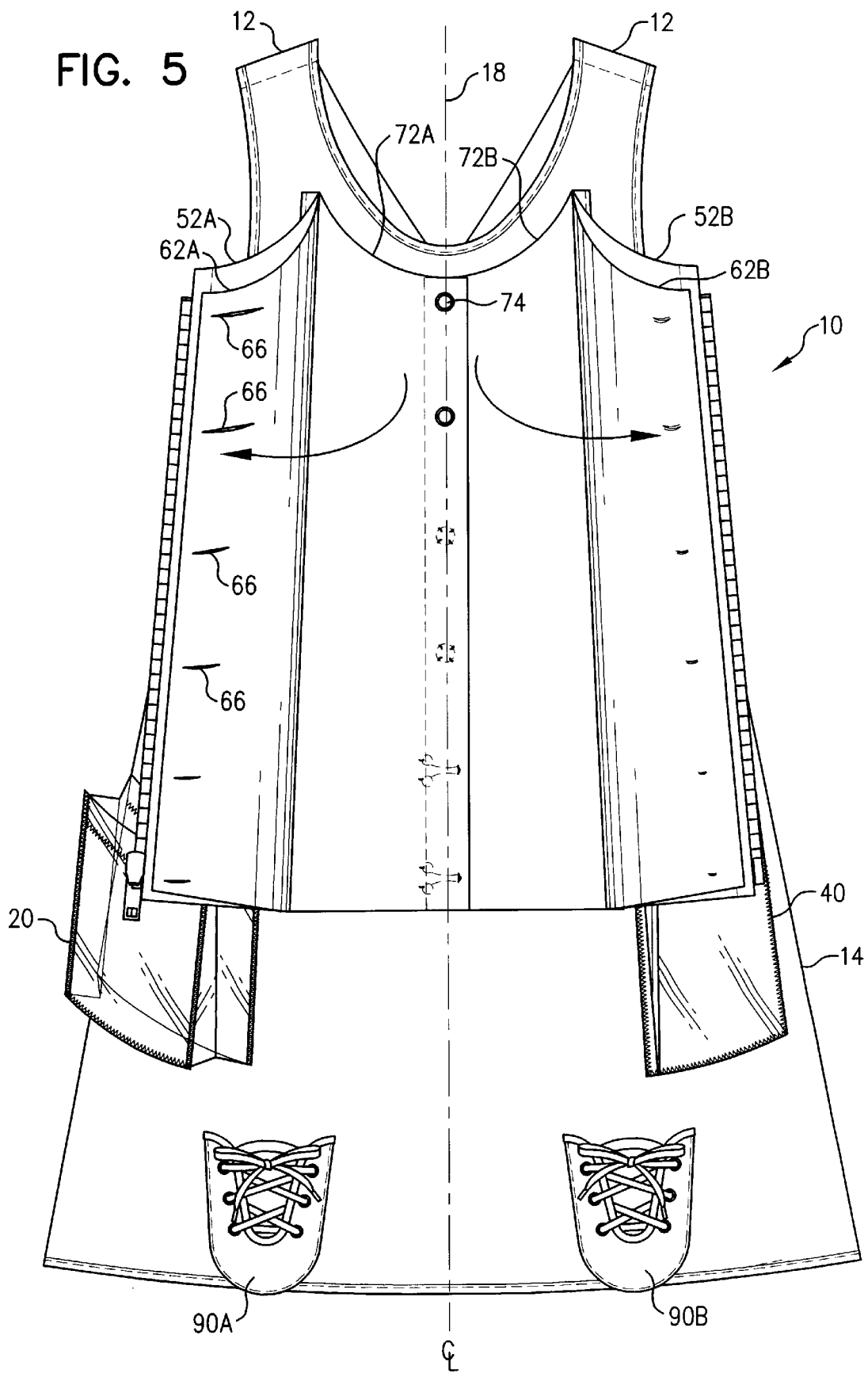
FIG. 5 shows both zipper panels and button panels in the open or unfastened state and folded back to reveal yet another of layered activities simulating a portion of other conventional articles of snap and hook closure apparel, for example, a shirt or a blouse.

FIG. 5 shows both zipper panels 52A and 52B and button panels 62A and 62B in the open or unfastened state and folded back to reveal yet another of layered activities 50. In FIG. 5, a third activity 70 constitutes a third layer of activities 50 positioned behind zipper panels 52 and button panels 62. Third activity 70 simulates a portion of other conventional articles of snap and hook closure apparel, for example, a shirt or a blouse. Third activity 70 again presents two panels 72A and 72B attached to the anterior face of body 14 on opposing sides of midline 18. Each panel 72A and 72B is formed of fabric and includes an interior edge lying essentially along midline 18. One of panel 72A and 72B is equipped with the male portion of one or more snaps 74 secured along its interior edge, while the other of panel 72A and 72B is equipped with one or more cooperating female snap portions 76 secured along its interior edge (more clearly shown in FIG. 6). Male snap portions 74 and cooperating female snap portions 76 are preferably of a size which permits of relatively easy manipulation. Optionally, snap portions 74, 76 are provided in varying configurations and varying sizes ranging from relatively large to relatively small, such that a range of manipulative challenges are presented to the user. For example, snap portions 74, 76 are provided in two different common configurations: a larger snap of a type typically found on a denim work shirt and a more delicate snap of a type typically found on a dress or lightweight blouse. Panels 72, in combination with cooperating snap portions 74, 76, thus present an opening which corresponds to a conventional opening in an article of apparel, for example, a heavy shirt or light blouse.

Figure 6:
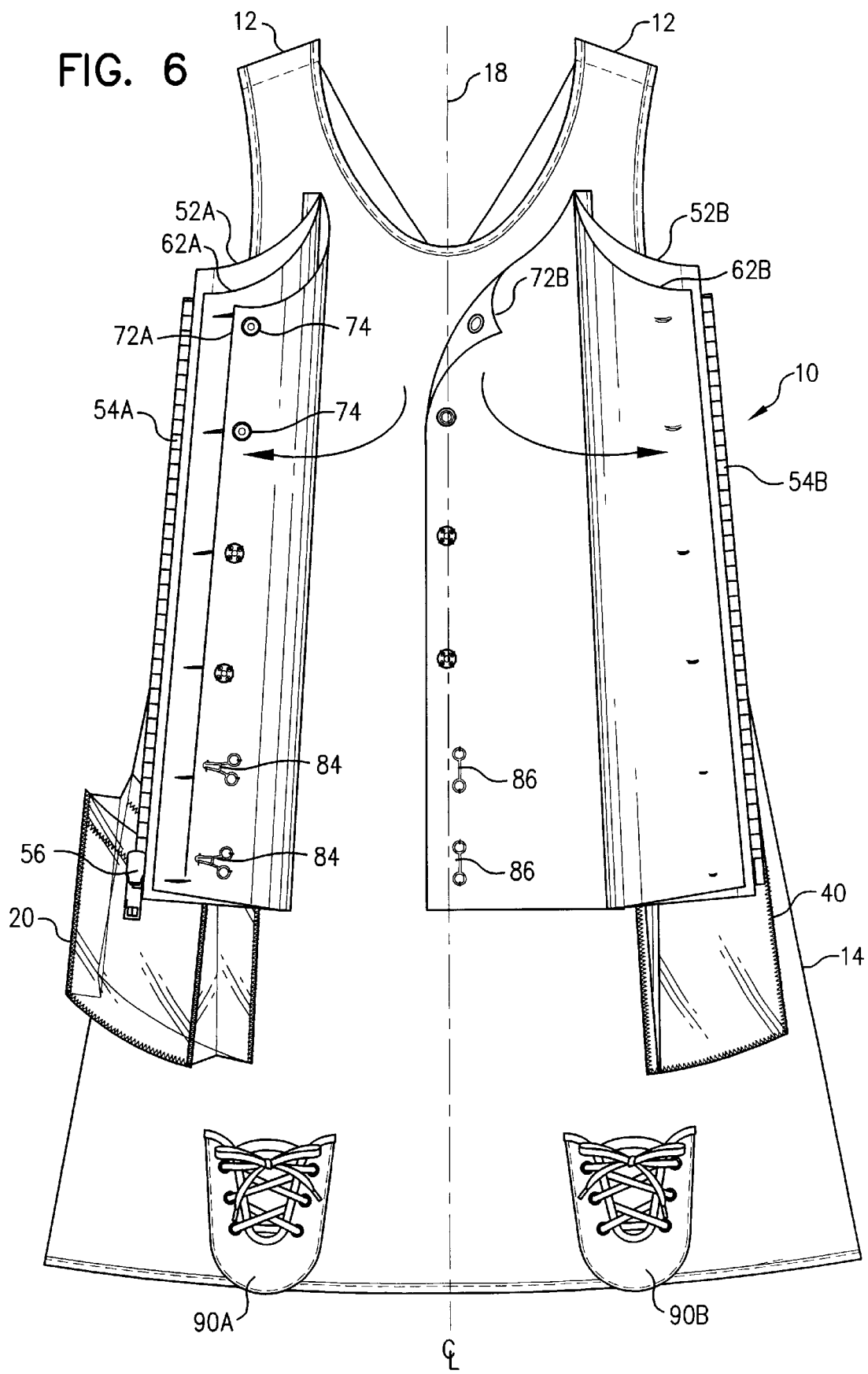
FIG. 6 shows snap panels in an opened or unfastened state and partially folded back to reveal the anterior face of the body of the apron and clearly illustrate one or more hooks secured along the interior edge of one panel and one or more cooperating eyes secured along the interior edge of an opposing panel.

FIG. 6 shows snap panels 72A and 72B in an opened or unfastened state and partially folded back to reveal the anterior face of body 14. As shown in FIG. 6, one of panel 72A and 72B is preferably further equipped with one or more hooks 84 secured along its interior edge, while the other of panel 72A and 72B is equipped with one or more cooperating eyes 86 secured along its interior edge. Hooks 84 and cooperating eyes 86 are preferably of a size that permits of relatively easy manipulation. Optionally, hooks 84 and cooperating eyes 86 are provided in varying configurations and varying sizes ranging from relatively large to relatively small, such that a range of manipulative challenges are presented to the user. However, in the preferred embodiment, hooks 84 and cooperating eyes 86 are provided in a relatively large configuration more common to heavy material, in contrast to more delicate configurations normally found on a dress or light-weight blouse. Panels 72, in combination with hooks 84 and cooperating eyes 86, thus present an opening which corresponds to a conventional opening in an article of apparel, for example, a heavy shirt or light jacket. As mentioned above, panels 72 are position by straps 12 on the person of the user in a fashion similar to that assumed by the actual article of apparel. Optionally, hooks 84 and cooperating eyes 86 are provided on the interior edges of an additional pair of fabric panels (not shown) attached to the anterior face of body 14 in layered fashion behind panels 72.

As those of ordinary skill in the art will recognize that the relative positions of any or all of zipper pull 56 to zipper panels 52A and 52B; buttons 64 and button holes 66 to button panels 62A and 62B; and both male 74 with female 76 snap portions and hooks 84 with eyes 86 relative to snap panels 72A and 72B, are reversed between traditional male and traditional female apparel. Thus, although shown in first relative positions, those of ordinary skill in the art will recognize that the relative positions of any or all of zipper pull 56; buttons 64 and button holes 66; male 74 and female 76 snap portions; and hooks 84 and eyes 86, are optionally reversed between their respective panels on the left-hand and right-hand sides of body 14 to better simulate one or the other of traditional male and female apparel.

As mentioned above and further shown in FIG. 6, apron 10 also includes simulated laced shoes 90A and 90B, described in below greater detail in connection with FIGS. 7 and 8. Shoes 90A and 90B simulate conventional lace-type shoes attached to the anterior face of body 14. Shoes 90A and 90B are preferably spaced apart on opposing sides of midline 18 and positioned below the user's waistline to rest approximately on the upper or anterior surface of the user's thighs. Thus positioned by straps 12, shoes 90A and 90B are in easy reach of the user having donned apron 10 in the fashion shown in FIG. 1. Straps 12 maintain the orientation of shoes 90, as well as the other training and rehabilitation elements described herein, relative to the person of the user to leave the user's hands free for training and rehabilitation. Each shoe 90A and 90B is formed of fabric, for example, canvas. Shoes 90 are preferably colored in contrast to body 14 of apron 10, such that they are easily discernable visually. For example, shoes 90 are optionally white, beige, tan or another light color when mated to a dark colored body 14. In FIG. 6, shoes 90A and 90B are both shown in the tied state.

Figure 7:
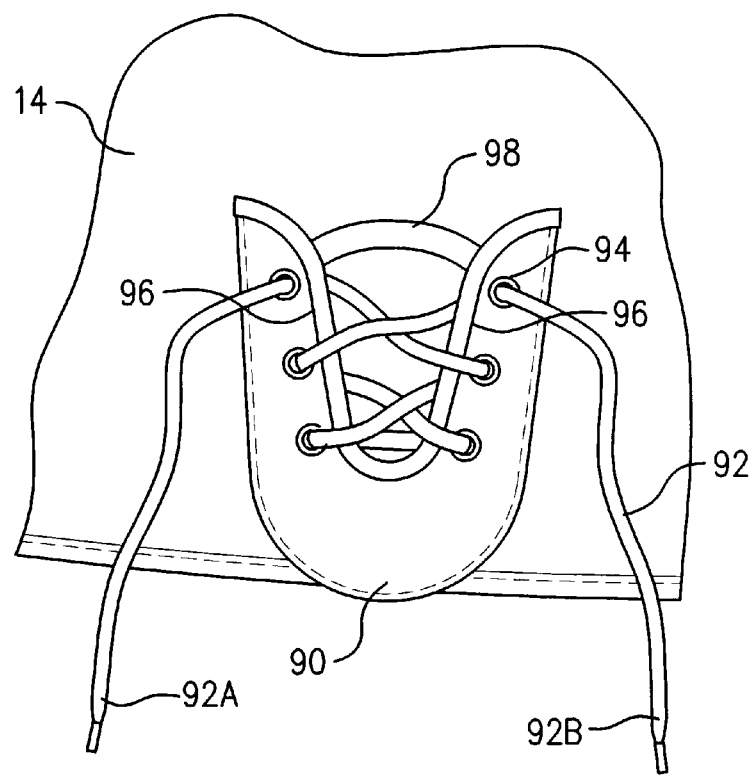
FIG. 7 shows one of simulated string-type lace shoes in a first open or untied state.

FIG. 7 shows one of shoes 90 having a conventional string-type lace 92 passing through multiple eyelets 94 aligned on opposing sides or lips 96A and 96B and backed by a tongue 98 as found in a conventional shoe. In FIG. 7, shoe 90 is shown in a first open or untied state. In this untied state, the user is challenged to manipulate the opposing ends 92A and 92B of lace 92 to create a bow or other knot normally associated with shoes. Optionally, lace 92 can be removed, whereby the user is manipulatively challenged to thread lace 92 through eyelets 94.

Figure 8:
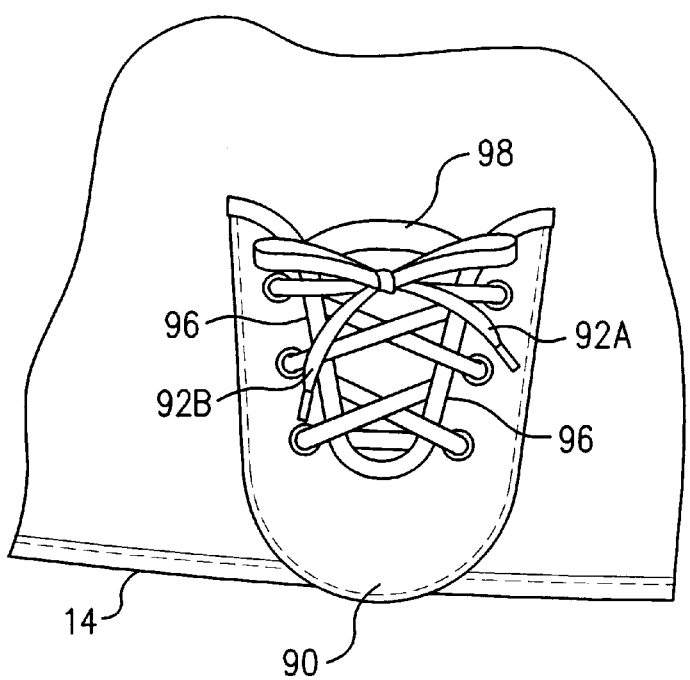
FIG. 8 shows one of simulated string-type lace shoes in a second or closed or tied state.

FIG. 8 shows one of shoes 90 having a conventional string-type lace 92 passing over tongue 98 and drawing opposing lips 96 together into a second or closed or tied state. In this tied state, the user is challenged to manipulate the lace 92 to untie a bow or other knot formed between the opposing ends 92A and 92B of lace 92.

Figure 9:
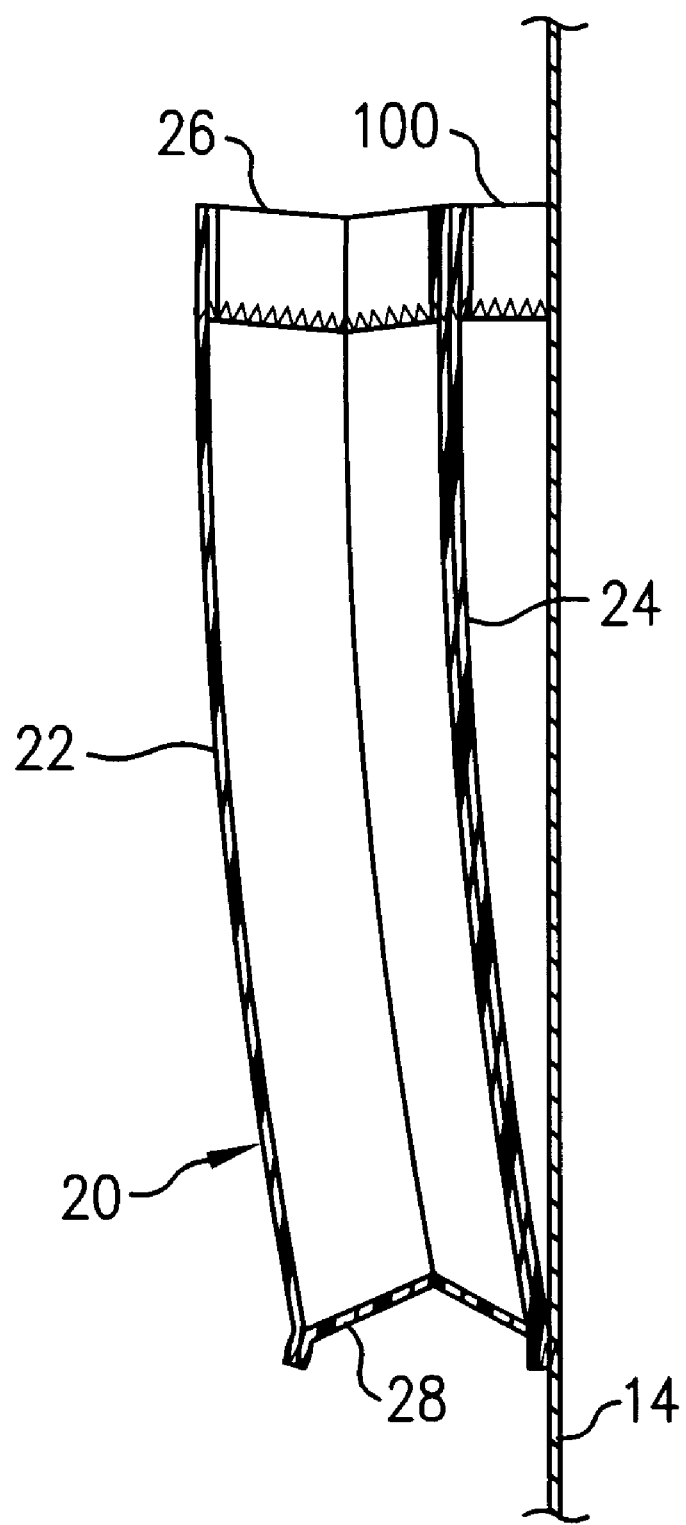
FIG. 9 is a detailed side view of accordion pocket as mounted on the face of the body of the apron and another or third pocket formed between the accordion pocket and the face of the body of the apron.

FIG. 9 is a detailed side view of pocket 20 as mounted on the face of body 14 of apron 10. As mentioned above and shown in FIG. 9, pocket 20 is preferably of an expanding or accordion configuration capable of storing relatively large objects. Accordion pocket 20 is preferably configured after a paper bag with flat front 22 and back 24 panels joined long side edges by accordion side panels 26A and 26B and along a lower edge by an accordion bottom panel 28. The elements of pocket 20 are preferably joined by sewing, but other conventional joining methods known to those of ordinary skill in the art, such as gluing or one-piece fabrication, are similarly contemplated. Accordion bottom panel 28 in combination with accordion side panels 26A and 26B provide pocket 20 with a large top opening for easy access. Accordion pocket 20 is attached at back panel 24 to the anterior face of apron 10. Pocket 20 is preferably formed of a relatively stiff fabric, whereby the user is able to insert a hand and larger objects. Preferably, the fabric of pocket 20 is capable of retaining such stiffness over time and through repeated cleanings, and is additionally essentially water resistant or waterproof, whereby wet, sticky or crumbly contents, such as is an amount of clay 30, are storable without stain or leakage. For example, plastic is a preferred fabric for the fabrication of pocket 20. Optionally, one or more of front 22, back 24, side 26 and bottom 28 panels are formed of a transparent plastic such that the objects stored therein are subject to visible inspection.

Furthermore, the attachment of accordion pocket 20 to the face of body 14 by sewing at the side and bottom edges of back panel 24 provides another or third pocket 100 formed between back panel 24 and the face of body 14. Pocket 100 thus formed include an upwardly facing opening, as shown. As formed between back panel 24 and the face of body 14, pocket 100 is useful for the storage of relatively thin flat items, such folded papers and the like.

Those of ordinary skill in the relevant art recognize that, although the foregoing invention has been described in detail for purposes of clarity, the present invention is not limited to the apron 10 described above and shown in the various figures of the drawing. For example, activities 50 provided in layered zipper panels 52, button panels 62, and snap panels 72 are combined in different sequences. In another example, back panel 24 of accordion pocket 20 is attached along all of side, bottom and top edges such that no additional pocket 100 is formed. Alternatively, accordion pocket 20 is formed using a portion of the face of body 14 as its back panel, such that accordion sides 26 and bottom 28 members are attached directly to body 14 and no additional pocket 100 is formed. Also, the term "midline" has been used to indicate a point at which complementary portions of the garment join, it should be understood that the exact location of the "midline" may be varied from the middle of the garment, and still fall within the teachings herein and the claims which follow. Thus, it is to be appreciated that certain modifications may be practiced within the scope of the appended claims. Although only a few exemplary embodiments of this invention have been described in detail, it will be readily apparent to those skilled in the art that my novel rehabilitation may be modified from those embodiments provided herein without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, the claims are intended to cover the structures described herein and not only structural equivalents thereof, but also equivalent structures. Thus, the scope of the invention is intended to include all variations described herein, whether in the specification or in the drawing, including the broad meaning and range properly afforded to the language and description set forth herein to describe such variations.

It will thus be seen that the objects set forth above, including those made apparent from the preceding description, are efficiently attained. Since certain changes may be made in carrying out the manufacture of a rehabilitation device according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the drawing) may be combined in any combination, except combinations where at least some of the features are mutually exclusive. Alternative features serving the same or similar purpose may replace each feature disclosed in this specification (including any accompanying claims, the drawing, and the abstract), unless expressly stated otherwise. Thus, each feature disclosed is only one example of a generic series of equivalent or similar features. Further, while certain materials are described for the purpose of enabling the reader to make and use certain embodiments shown, such suggestions shall not serve in any way to limit the claims to the precise materials disclosed, and it is to be understood that other materials may be utilized in the manufacture of my rehabilitation device.

The intention is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. The scope of the invention, as described herein and as indicated by the appended claims, is thus intended to include variations from the embodiments provided which are nevertheless described by the broad meaning and range properly afforded to the language of the claims, as explained by and in light of the terms included herein, or the equivalents thereof.

I claim:

1. A rehabilitation/training device, said device comprising:
    a fabric apron including fastening straps spaced apart on opposing sides of said apron, said straps adapted for securing said apron on the body of a person;
    a plurality of pairs of fabric panels attached in layered fashion on an anterior portion of said apron, one of each of said pairs of fabric panels positioned on either side of an apron;
    a first of said pairs of fabric panels including one or more cooperating snap fasteners secured to adjacent edges of complementary portions of said first pair of fabric panels;
    a second of said pairs of fabric panels including one or more button fasteners and one or more cooperating button holes positioned at adjacent edges of complementary portions of said second pair of fabric panels;
    a third pair of said pairs of fabric panels including a pair of zipper tracks secured to adjacent edges of complementary portions of said first pair of fabric panels, said pair of zipper tracks including a zipper pull cooperating with said zipper tracks to effect, alternately, closure or opening;
    one or more shoe panels attached on said anterior portion of said apron remote from said plurality of pairs of fabric panels, each of said one or more shoe panels including a plurality of eyelets formed therein and a shoe lace threaded through one or more of said eyelets
    one or more pockets attached to said anterior portion of said apron remote from said plurality of pairs of fabric panels and from said one or more shoe panels.

2. The rehabilitation/training device recited in claim 1, wherein each said strap extends between said anterior portion of said apron on one side of said midline and a posterior portion of said apron on an opposing side of said midline, whereby each said strap crosses said midline behind the body of a person wearing said device.

3. The rehabilitation/training device recited in claim 1, wherein one or more of said plurality of pairs of fabric panels further comprises one or more cooperating hook and eye fasteners secured to complementary adjacent edge portions of said pair of fabric panels.

4. The rehabilitation/training device recited in claim 3, wherein said one or more cooperating hook and eye fasteners further comprise a plurality of cooperating hook and eye fasteners, and wherein one of said cooperating hook and eye fasteners is differently configured relative to other ones of said cooperating hook and eye fasteners.

5. The rehabilitation/training device recited in claim 1, wherein said one or more cooperating snap fasteners further comprises a plurality of types of cooperating snap fasteners, and wherein one of said types of cooperating snap fasteners is differently configured relative to other ones of said cooperating snap fasteners.

6. The rehabilitation/training device recited in claim 1, wherein said one or more button fasteners and one or more cooperating button holes further comprises a plurality of cooperating buttons and button holes, and wherein one of said cooperating buttons and button holes is differently configured relative to other ones of said cooperating buttons and button holes.

7. The rehabilitation/training device recited in claim 1, further comprising one or more minor pockets.

8. The rehabilitation/training device recited in claim 7, wherein said one or more minor pockets comprise a fabric forming panel.

9. The rehabilitation/training device recited in claim 1, wherein at least one of said one or more minor pockets is essentially waterproof.

10. The rehabilitation/training device recited in claim 9, wherein said essentially waterproof one of said one ore more minor pockets comprises expanding side and bottom panels.

11. The rehabilitation/training device recited in claim 10, wherein said essentially waterproof one of said one or more minor pockets formed with said expanding side and bottom panels is adapted to contain a squeezable object.

12. A rehabilitation/training device in the form of an apron, the device comprising:
    a fabric body panel including two integral straps spaced apart on opposing sides of a midline of said body panel, each said integral strap extending between anterior and posterior portions of said body panel and forming an arm hole therebetween;

a first pair of fabric panels attached on said anterior portion of said body panel, one of said first pair of fabric panels positioned on each side of said midline of said body panel;

one or more male snap portions secured to an edge of one of said first pair of fabric panels adjacent said midline;

one or more female snap portions secured to an edge of another of said first pair of fabric panels adjacent said midline, each said female snap portions cooperating with a corresponding one of said male snap portions to form a snap closure device;

a second pair of fabric panels attached on said anterior portion of said body panel layered over said first pair of fabric panels, one of said second pair of fabric panels positioned on each side of said midline of said body panel;

one or more buttons secured to an edge of one of said second pair of fabric panels adjacent said midline;

one or more button holes formed in an edge of another of said second pair of fabric panels adjacent said midline, each said button hole cooperating with a corresponding one of said buttons to form a button closure device;

a third pair of fabric panels attached on said anterior portion of said body panel layered over said first pair of fabric panels and said second pair of fabric panels, one of said third pair of fabric panels positioned on each side of said midline of said body panel;

a zipper track secured to an edge of each of said third pair of fabric panels adjacent said midline;

a zipper pull integral with one of said zipper tracks and cooperating with another of said zipper tracks to form a zipper closure device;

a fourth pair of fabric panels attached on said anterior portion of said body panel, one of said fourth pair of fabric panels positioned on each side of said midline of said body panel, each of said fourth pair of fabric panels divided into two opposing lip portions;

a plurality of eyelets formed in each of said opposing lip portions of each said fourth pair of fabric panels, each said eyelet adapted to pass a shoe string through said lip portion;

first and second shoe strings passing through said eyelets formed in each of said fourth pair of fabric panels, respectively; and first and second pockets attached on said anterior portion of said body panel, one of said first and second pockets positioned on each side of said midline of said body panel.

13. The rehabilitation/training device recited in claim 12, further comprising:

one or more hooks secured to an edge of one said panels of one of said first, second, or third pairs of fabric panels adjacent said midline; and one or more eyes secured to an edge of a corresponding other one of said first, second, or third pairs of fabric panels, each said eye cooperating with a corresponding one of said hooks to form a hook-and-eye closure device.

14. The rehabilitation/training device recited in claim 12, wherein said one or more cooperating male and female snap portions further comprise a plurality of cooperating male and female snap portions; and wherein said cooperating male and female snap portions comprise at least two different sizes of cooperating male and female snap portions.

15. The rehabilitation/training device recited in claim 12, wherein said one or more cooperating buttons and button holes further comprise a plurality of cooperating buttons and button holes; and wherein said cooperating buttons and button holes comprise at least two different sizes of cooperating male and female snap portions.

16. The rehabilitation/training device recited in claim 12, wherein at least one of said first and second pockets is formed of an essentially waterproof material.

17. The rehabilitation/training device recited in claim 16, wherein said one of said first and second pockets formed of an essentially waterproof material is adapted to contain a hand exercise device.

18. The rehabilitation/training device recited in claim 17, wherein said one of said first and second pockets formed of an essentially waterproof material is formed with accordion side and bottom panels.

19. The rehabilitation/training device recited in claim 18, wherein said hand exercise device comprises a hand exercise device selected from the group consisting of (a) a clay mass, (b) Silly Putty®, (c) a rubber ball, and (d) a hand grip.

20. The rehabilitation/training device recited in claim 12, further comprising one or more minor pockets, wherein at least one of said minor pockets is adapted for receiving and carrying a writing implement.

21. The rehabilitation/training device recited in claim 12, wherein one of said first and said second pockets comprises at least one minor pocket.

* * * * *